(No Model.) 2 Sheets—Sheet 1.

O. RAU.
ELECTRIC RAILWAY TROLLEY BASE.

No. 502,530. Patented Aug. 1, 1893.

Witnesses
C. E. Ashley
H. W. Lloyd

Inventor
Otto Rau
By his Attorney
Charles J. Kintner (No Model.) 2 Sheets—Sheet 2.
O. RAU.
ELECTRIC RAILWAY TROLLEY BASE.

No. 502,530. Patented Aug. 1, 1893.

Witnesses
C. E. Ashley
H. W. Lloyd

Inventor
Otto Rau
By his Attorney
Charles J. Kintner

UNITED STATES PATENT OFFICE.

OTTO RAU, OF JERSEY CITY, NEW JERSEY, ASSIGNOR OF ONE-HALF TO ROBERT S. DOBBIE, OF NEW YORK, N. Y.

ELECTRIC-RAILWAY-TROLLEY BASE.

SPECIFICATION forming part of Letters Patent No. 502,530, dated August 1, 1893.

Application filed October 31, 1891. Serial No. 410,545. (No model.)

*To all whom it may concern:*

Be it known that I, OTTO RAU, a citizen of the United States, residing at Jersey City, in the county of Hudson and State of New Jersey, have made a new and useful invention in Trolley-Pole Bases for Use in Connection with Trolleys in Electric Railways, of which the following is a specification.

My invention is directed particularly to an improved manner of attaching a trolley pole to a base or support on the top or body of a car or moving vehicle, and it has for its object the maintenance of the pole at various angular positions with a minimum strain upon the trolley and its attached parts at all times. I accomplish this object with the apparatus hereinafter described, but particularly pointed out in the claims which follow this specification.

Prior to my invention trolley poles have been attached to the top of a car or vehicle by a coiled spring secured directly to the end of the pole and to the base or support upon the top of the vehicle, the spring being of such a nature as to permit the pole to assume any angle imparted to it, either by virtue of the movement of the trolley wheel or the guide-cord in the hands of an attendant. With trolley poles as thus arranged, however, there results a maximum strain upon the pole when it is caused to assume the greatest angle from a vertical position, thereby tending largely to strain or rupture the parts, and necessitating the exercise of considerable strength on the part of the attendant to manipulate it. It was with a view of overcoming these objectionable features that my invention was devised. It will be fully understood by referring to the accompanying drawings, in which—

Figure 1:
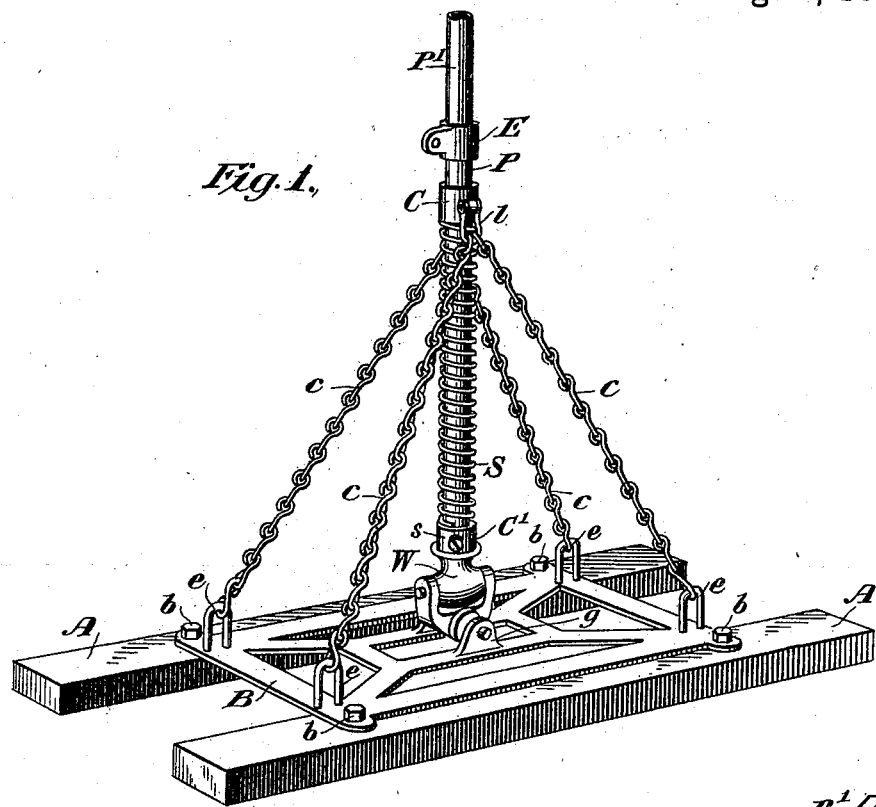
Figure 2:
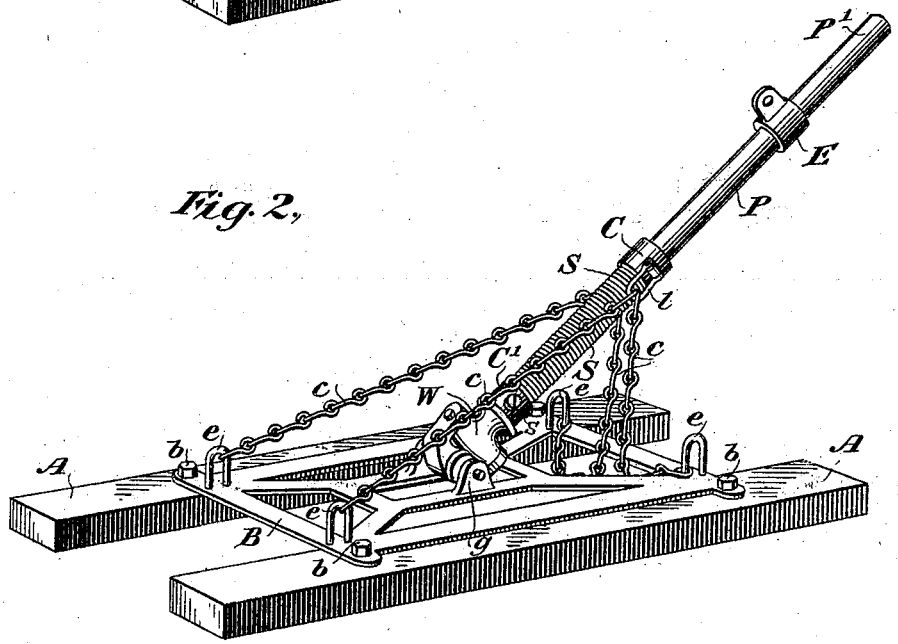
Figure 3:
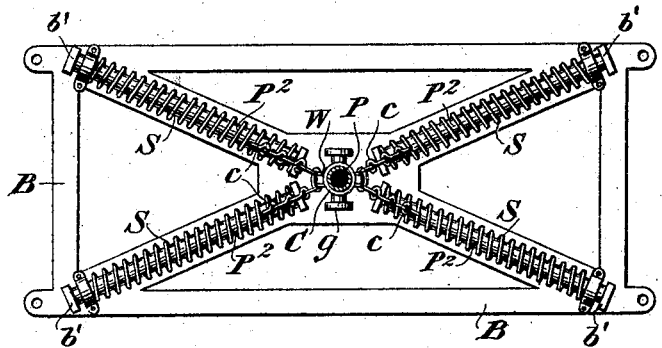

Figures 1 and 2 are perspective views, showing the trolley pole in different positions, and attached to a base or support, which in turn may be secured to the top or body of a car or vehicle. Fig. 3 is a plan and Fig. 4 a side elevational view of a modified form of my invention, while Fig. 5 is a detail view showing still another way of securing the guys.

Referring to the drawings in detail, A A represent parallel timbers to which the base B. of the trolley pole is secured by bolts $b$., said base B. being preferably of metal and provided near its center with a pair of ears or lugs which constitute the support for a universal joint W., in the upper portion of which is screwed a short hollow tube of iron or steel P., which is preferably slitted at its upper end so as to admit of the insertion of the hollow trolley pole P', also of steel and secured to the short sectional tube P by a screw collar E.

Figure 5:
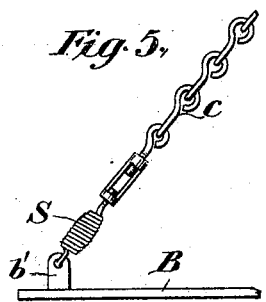

$e. e. e. e.$ are eyes or staples secured to the corners of the base B., and $c. c. c. c.$ are guys or stays made, as shown, in chain form although they may be in the nature of strong spiral springs as shown in Fig. 5, of sufficient elasticity to meet the requirements of the case. These guys or stays are attached at their lower ends to the eyes or staples $e$., and at their upper ends to a pair of ears $l$., which in turn are pivotally secured to a sliding collar C adapted to move longitudinally upon the short tube P. This collar C. rests freely upon the upper end of a strong spiral spring S made preferably of steel and resting at its lower end upon an adjustable collar C' provided with set screws $s$. for varying the location of the collar, and hence the compression of the spring S. An insulated conductor (not shown) runs from the motor on board of the car and is carried through the short hollow tube P., and the trolley pole P' to the trolley wheel (not shown) in the usual manner, these matters being well understood by those skilled in the art.

The operation of the apparatus is obvious upon inspection of the drawings. It will be noticed that by reason of the angular relation of the guys or stays $c$. to the short supporting tube P and spring S the stress upon the trolley pole P' will be virtually a constant factor; that is to say, when the trolley pole is in a vertical position, as shown in Fig. 1, the several guys acting upon the spring S maintain it substantially in this position for ordinary pressure. When, however, the pole is made to assume the position shown in Fig. 2, the spring S will be put under compression but the angle of the application of the power upon the guys $e$. assumes such a changed relation that the pressure at the trolley does not vary materially from that exerted when it is at its upper position, and this I regard as a very important feature in connection with my invention. The universal nature of the joint W also permits the trolley pole P' to assume various lateral, as well as vertical, positions, without being subjected to any undue strain for the reason already indicated.

Figure 4:
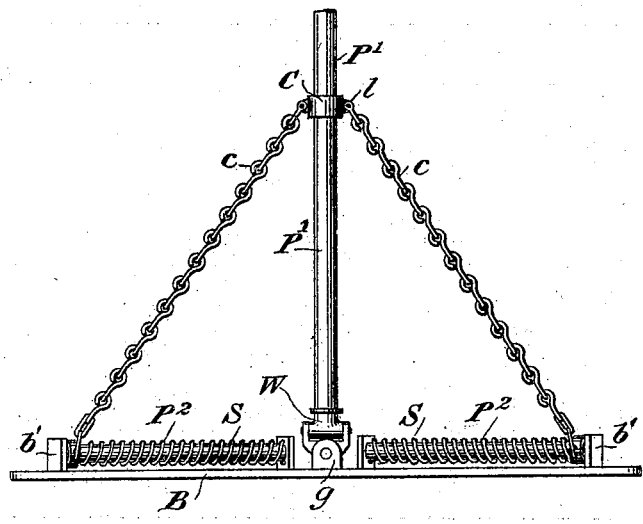

In the modified forms shown in Figs. 3 and 4 the spiral spring S of Figs. 1 and 2 is replaced by a series of spiral springs arranged around radially disposed horizontal rods $P^2$ four in number attached to the base B lugs or ears $b'$, the arrangement being such that the spiral springs are compressed by the action of the chains $c$ when the position of the trolley pole P'. is varied from a vertical line,— the collar C in this instance being secured to the pole P'.

I do not limit myself to the specific constructions herein described and shown, as I believe I am entitled to claim broadly a trolley pole support provided with a yielding connection with its base and elastic or yielding guys or stays which permit the trolley pole to assume different positions without being subjected to abnormal strain, and I desire it understood that my claims are generic in this particular.

Having thus described my invention, what I claim, and desire to secure by Letters Patent of the United States, is—

1. A trolley pole secured to a base or support by a universal joint, guys or stays for holding the pole in a vertical position, said guys being attached to a yielding or spring supported collar, substantially as described.

2. A trolley pole support consisting of a tube pivotally secured to a base or support and sustained by guys or stays attached to the base and to a collar attached to a yielding spring surrounding the tube and adapted to slide vertically thereon, substantially as described.

3. A trolley pole support consisting of a short tube connected to a base by a universal joint and provided with guys or stays connected to the base and to a collar surrounding the tube and resting on an adjustable coiled spring.

OTTO RAU.

Witnesses:
C. J. KINTNER,
R. S. DOBBIE.